United States Patent [19]

Ito et al.

[11] Patent Number: 5,196,383
[45] Date of Patent: Mar. 23, 1993

[54] METHOD FOR PRODUCING RARE EARTH ELEMENT-DOPED GLASS BY SOL-GEL PROCESS

[75] Inventors: Masumi Ito; Tatsuhiko Saitoh; Hiroshi Yokota, all of Yokohama, Japan

[73] Assignee: Sumitomo Electric Industries, Ltd., Osaka, Japan

[21] Appl. No.: 610,226

[22] Filed: Nov. 9, 1990

[30] Foreign Application Priority Data

Dec. 20, 1989 [JP] Japan .................................. 1-328123
Dec. 28, 1989 [JP] Japan .................................. 1-338744

[51] Int. Cl.$^5$ .............................................. C03C 3/095
[52] U.S. Cl. ........................................ 501/12; 65/901; 501/64
[58] Field of Search ....................... 501/12, 64; 65/901

[56] References Cited

U.S. PATENT DOCUMENTS 4,789,389 12/1988 Schermerhorn et al. ............. 501/12

FOREIGN PATENT DOCUMENTS 265983 5/1988 European Pat. Off. .
61-086429 5/1986 Japan .................................. 501/12
62-143830 6/1987 Japan .................................. 501/12

OTHER PUBLICATIONS

Miyashita, Satoru, "Manufacture of Cerium-Containing Quartz-Based Glass for Lasers", Chem. Abstracts, May 1, 1989, vol. 110, No. 9 p. 320.
B. Samuneva et al., "Silica-Alumina-Lathanium . . . ", 6001 Chemical Abst., Nov. 1987, vol. 107, No. 18,02 p. 360.
E. J. A. Pope et al., "ND-Doped Silica Glass 1: . . . ", Joun. of Non-Crystalline Solids, pp. 236-241, vol. 106, No. 1-3 (1988).
K. Sun et al., "Sol-Gel Preparation of Rare-Earth . . . " Journ. of Non Crystallilne Solid, vol. 92 No. 1 Jun. 1987 pp. 145-152.
Chemical Abstracts, vol. 107, No. 16 Oct. 1987 p. 333, Abstract #107:139507s.
W. H. Lee et al., "Actinide Silicate Binary Glasses: . . . " Journ of Non-Crystalline Solids, vol. 104 No. 1 Aug. 1988, pp. 123-128.
Samuneva, B., et al. Study of melting of silica-alumina-lanthanum oxide-system glasses obtained by sol-gel technology, Chemical Abstract 107:159903w (1986).

*Primary Examiner*—Karl Group
*Assistant Examiner*—Anthony J. Green
*Attorney, Agent, or Firm*—Cushman, Darby & Cushman

[57] ABSTRACT

A rare earth element-doped glass in which the rare earth element is homogeneously doped is produced by a method coprises hydrolyzing a metal alkoxide of the formula:

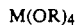

$$M(OR)_4$$

wherein M is a metal and R is an alkyl group in a liquid medium selected from the group consisting of alcohols and water in the presence of a compound of a rare earth element and condensing the hydrolyzed material to form a rare earth element-doped glass.

5 Claims, 2 Drawing Sheets

METHOD FOR PRODUCING RARE EARTH ELEMENT-DOPED GLASS BY SOL-GEL PROCESS

BACKGROUND OF THE INVENTION

1. Field of the Invention

The present invention relates to a method for producing a rare earth element-doped glass which exhibits properties of the rare earth by a sol-gel process.

2. Description of the Related Art

In the production of a glass optical fiber such as quartz glass optical fiber, techniques for producing a highly pure material and controlling optical structure have been almost completed, and the glass optical fiber is practically and widely used.

Since it was found that a glass added with, for example, $Nd^{3+}$ ions as active ions could generate a laser beam in the 1960s, it has been confirmed that a glass added with various rare earth elements such as $Er^{3+}$, $Yb^{3+}$, $Ho^{3+}$ or $Tm^{3+}$ can also generate a laser beam. This is because the laser transition in the trivalent rare earth element ions is the f-f transition so that it gives a narrow spectrum width in the glass.

The glass has many advantages for practical use, in that it can provide a large size mass compared to a crystalline material, and it is homogeneous and easily processed. In addition, the glass can be easily processed in a fiber form and used to assemble a telecommunication optical fiber system.

Two methods are known for addition of the rare earth element to the glass optical fiber, such as a quartz glass optical fiber, a vapor phase method and a solution impregnating method.

The vapor phase method includes a method comprising heating a chloride of a rare earth element to vaporize it, and introducing the vaporized chloride into a reaction tube together with a quartz glass-forming raw material, such as silicon tetrachloride, in order to form a glass which contains the rare earth element. Another type of vapor phase synthesis is a method comprising heating a mass of silica particles to vitrify it in an atmosphere comprising a vapor of the rare earth elements. This adds the rare earth element to the glass.

Typically, the solution impregnating method comprises dipping a mass of silica particles into a solution of the rare earth element in an alcohol or water, evaporating the alcohol or water and sintering the mass of silica particles to produce a glass containing the rare earth element.

The above conventional methods for producing the rare earth element-doped glass are based on the techniques for producing quartz glass optical fibers and have various merits in quality and productivity. However, by the vapor phase method, the rare earth element is added to the glass in an amount of several ppm to several ten ppm. When the solution impregnating method is used, the rare earth element can be added in an amount up to several thousand ppm. However, the amount of the impregnated rare earth element varies due to the bulk density profile in the mass of silica particles. This makes it difficult to produce a glass in which the rare earth element is uniformly added.

SUMMARY OF THE INVENTION

One object of the present invention is to provide a method for producing a rare earth element-doped glass in which the rare earth element is homogeneously doped.

Another object of the present invention is to provide a method for producing a rare earth element-doped glass by which the doped amount of the rare earth element can be controlled.

These and other objects of the present invention can be achieved using a method for producing a rare earth element-doped glass of the present invention, which method comprises hydrolyzing a metal alkoxide of the formula:

$$M(OR)_4$$

wherein M is a metal and R is an alkyl group, wherein the hydrolysis takes place in a liquid medium selected from the group consisting of alcohols containing water, in the presence of a compound of a rare earth element and condensing the hydrolyzed material to form a rare earth element-doped glass.

The doped glass produced by this method is suitable for making an optical devices such as a fiber laser, a glass laser or an optical switch.

DETAILED DESCRIPTION OF THE INVENTION

In the present invention, any of the metal alkoxides from which a glass is produced by the so-called solgel process may be used. Specific examples of the metal alkoxide are $Si(OR)_4$, $Ge(OR)_4$, $Al(OR)_3$, $Ti(OR)_4$, $B(OR)_3$ and mixtures thereof. The alkyl group R is preferably a straight or branched alkyl group having 1 to 8 carbon atoms. Specific examples of the alkyl group are a methyl group, an ethyl group, a n-propyl group, an isopropyl group, a n-butyl group and a tert.-butyl group. When $Si(OR)_4$ is used as the metal alkoxide, a quartz glass is formed.

The compound of rare earth element to be used in the present invention is preferably at least one compound of an element selected from the group consisting of lanthanide and actinide elements. Examples of the lanthanoid elements are La, Ce, pr, Nd, Pm, Sm, Eu, Gd, Tb, Dy, Ho, Er, Tm, Yb and Lu. Examples of the actinide elements are Ac, Th, Pa, U, Np, Pu, Am, Cm, Bk, Cf, Es, Fm, Md, No and Lr. Among them, the lanthanide elements which generate the laser, such as Er, Yb, Ho, Tm, Nd, Eu, Tb and Ce are more preferred.

Examples of the compound of the rare earth element are chloride, nitrate, sulfate, acetate, etc.

In the method of the present invention, the metal alkoxide is added to the alcohol containing water and hydrolyzed in the presence of at least one compound of the rare earth element. Preferred examples of the alcohol are methanol, ethanol, n-propanol, isopropanol and butanol.

The hydrolysis conditions may be substantially the same as those employed in the conventional hydrolysis of the metal alkoxide.

Figure 1:
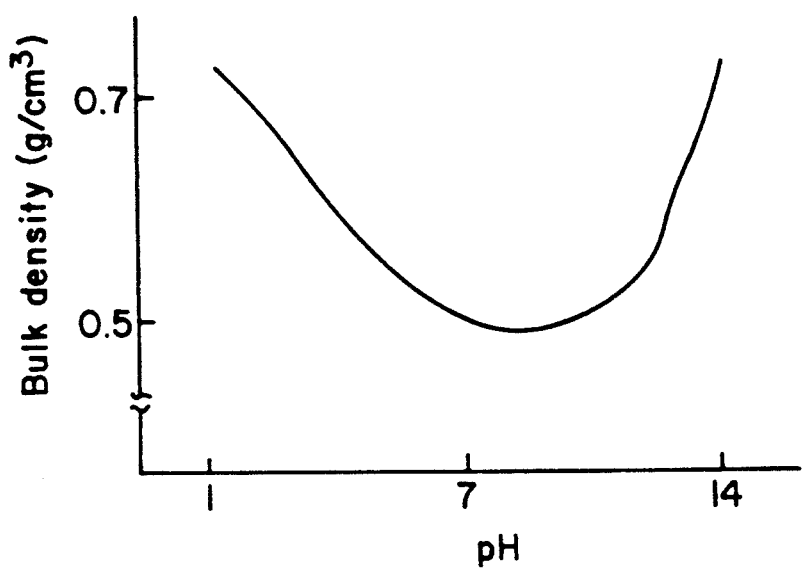
FIG. 1 is a graph showing a relationship between pH values and the bulk density of the gel.

The pH of the mixture may affect the conditions of the later formed gel. The pH of the present mixture is preferably adjusted to be in a range between 6 and 9 with an alkali solution such as aqueous ammonia. When the gel is formed through hydrolysis of Si(OR)$_4$ in the pH range between 7 and 9, it is not cracked during drying. This allows production of a large size bulk. The reason for this may be explained from a relationship between the pH of the mixture for hydrolysis and a bulk density of the synthesized gel. As shown in FIG. 1, the bulk density is minimized in the pH range between 7 and 9. A gel having the small bulk density has large pores therein so that water or other liquids for easily evaporate and the gel is hardly cracked during drying.

The amount of the added rare earth element depends on the solubility of the rare earth element compound. In general, the rare earth element chloride such as NdCl$_3$, YbCl$_3$, HoCl$_3$ or TmCl$_3$ is soluble in water and has large solubility in the alcohol. In this case the rare earth element chloride can be practically used.

An amount of the rare earth element to be added to the glass depends on the solubility of rare earth element compound in the alcohol or water and is usually from 100 to 100,000 ppm. For example, 50 grams of NdCl$_3$ can be dissolved in 100 grams of water. Such solubility is practically satisfactory at a practical level. Since the rare earth element is added in a liquid phase, it can be homogeneously added to the glass. The amount of the rare earth element added to the glass can be adjusted by changing the amount of the rare earth element compound which is added to the starting mixture. This is one of the advantages of the present invention.

In the conventional methods, the rare earth element is added to the synthesized glass, which results in the rare earth element and the glass-forming elements are not being sufficiently bonded. In such case, the rare earth element forms clusters or crystals, which adversely affect the generation of laser or optical properties of the doped glass. However, in the present invention, the rare earth element is trapped in the network of the glass during formation of the glass from the metal. This produces glass with good quality and properties.

If the amount of the rare earth element compound is increased to increase the doped amount of the rare earth element, atoms of the rare earth element associate together so that the properties of the rare earth element cannot be effectively utilized. This may be because, in the quartz glass, the rare earth atoms which are independently doped in the SiO$_2$ network cannot coordinate the oxygen ions sufficiently so that the network is unstabilized by strain generated in the network. Then, the rare earth atoms associate together to restabilize the network.

To prevent the association of the rare earth atoms, co-doping of the rare earth element with other metals such as Al or P is effective.

Accordingly, in an embodiment of the present invention in which Si(OR)$_4$ is used as the metal alkoxide, it is preferred that the rare earth element compound and other metal alkoxide are previously hydrolyzed to prepare a solution containing the rare earth element, this solution is added to the mixture of Si(OR)$_4$ and the alcohol containing water. The previous hydrolysis may be carried out at a reaction temperature of 20° to 40° C. for 1 to 3 hours in the presence of a catalyst such as hydrochloric acid or aqueous ammonia. Preferred examples of the other metal alkoxide are alkoxides of Ge, Al, P and B. Further, a glass-forming element such as Wo and Te may be used. Preferably Al and P are used as the other metal alkoxide. Usually, 5 to 6 moles of the other metal is used per one mole of the rare earth element.

As hydrolysis of the metal alkoxide proceeds in the alcohol containing water, a sol is formed and then the sol is changed to a gel.

The gel is heated and dried. The drying is carried out at a temperature of at least 60° C., preferably from 60° C. to 200° C., for example from 120° C. to 200° C. When the drying temperature is lower than 60° C., residual water cannot be sufficiently removed.

The dried gel is then dehydrated, preferably in a chlorine-containing atmosphere, and then is vitrified at a sufficiently high temperature, for example, higher than 200° C. in a helium atmosphere or under vacuum. This gives a glass containing the rare earth element in the form of an oxide.

PREFERRED EMBODIMENTS OF THE INVENTION

The present invention will be illustrated by the following Examples.

EXAMPLE 1

Silicon tetramethoxide (500 ml), water (250 ml), 0.1N HCl (20 ml) and erbium chloride (3.3 g) dissolved in methanol (50 ml) were charged in a beaker and mixed with a magnetic stirrer for about two hours. Then, the mixture was poured in a messcylinder made of polytetrafluoroethylene (Teflon, a trade mark), and the messcylinder was sealed with an aluminum adhesive tape and kept standing at 60° C. for one day. After making several holes in the aluminum tape, the mixture in the messcylinder was kept standing at 60° C. for ten days to obtain a dried gel.

The dried gel was dehydrated in an atmosphere containing 7% of chlorine at 800° C. for about two hours followed by heating in a helium atmosphere at 1300° C. for two hours to obtain a transparent pink glass. Elemental analysis of the glass revealed that it contained about 1 % by weight of erbium.

Example 2

In a mixture of aluminum methoxide (5 ml), ethanol (10 ml) and 0.1N aqueous ammonia (0.1 ml), and erbium chloride (3.3 g) was dissolved and stirred for two hours. Then, silicon tetramethoxide (500 ml), water (500 ml), ethanol (750 ml) and 0.1N aqueous ammonia (20 ml) were added to the mixture and stirred for two hours.

The resulting mixture was poured in a messcylinder made of polytetrafluoroethylene (Teflon, a trade mark), and the messcylinder was sealed with an aluminum adhesive tape and kept standing at 35° C. for one day to form a gel. Then, the mixture was heated to 80° C. over two days. After making small holes in the aluminum tape, the mixture in the messcylinder was kept standing at 80° C. for five days, heated to 150° C. over four days, kept standing at 100° C. for one day and then evacuated under vacuum at 200° C. to obtain a dried gel.

The dried gel was heated to 1200° C. at a heating rate of 1° C./min. and kept at that temperature for two hours to obtain a transparent glass. Elemental analysis of the glass revealed that it contained 1% by weight of erbium.

EXAMPLE 3

Figure 2:
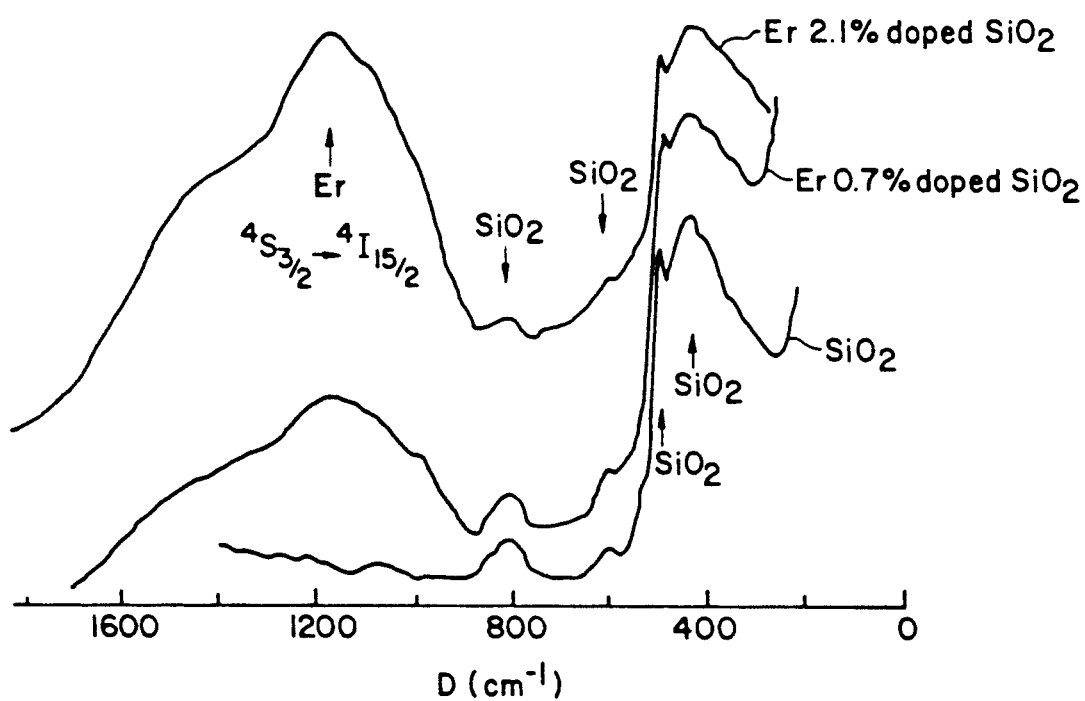
FIG. 2 is a Raman spectra for erbium-doped glass produced in Example 3 and the pure $SiO_2$ glass.

In the same manner as in Example 2, a SiO$_2$ glass containing 0.7% by weight or 2.1% by weight of erbium was produced and its Raman spectrum was recorded and compared with the Raman spectrum of pure $SiO_2$. The spectra are shown in FIG. 2. The peaks indicated by the arrows are assigned to $SiO_2$ and are not affected by the addition of erbium. This result means that erbium is homogeneously dispersed in the erbium-doped glass.

EXAMPLE 4

To a mixture of phosphorus methoxide (6 ml), ethanol (12 ml) and water (6 ml), 0.1N hydrochloric acid (0.5 ml) and neodymium chloride (3.4 g) were added and stirred at 30° C. for two hours to hydrolyze phosphorus methoxide. To this mixture, silicon methoxide (500 ml), water (500 ml), ethanol (750 ml) and 0.1N aqueous ammonia (20 ml) were added and stirred for one hour. The resulting mixture was charged in a messcylinder made of polytetrafluoroethylene (Teflon, a trade mark), and the messcylinder was sealed with an aluminum adhesive tape and kept standing at 35° C. for one day to form a gel. Then, the mixture was heated to 80° C. over two days. After making small holes in the aluminum tape, the mixture in the messcylinder was kept standing at 80° C. for five days, heated to 150° C. over four days and kept standing at that temperature for one day followed by evacuation under vacuum at 200° C. for eight hours to obtain a dried gel.

The dried gel was heated in the air to 350° C. at a heating rate of 1° C./min. to remove the residual carbon. Thereafter, the gel was heated to 800° C. at a heating rate of 1 C./min. and a chlorine gas was introduced in the messcylinder to dehydrate the gel. The dehydrated gel was heated to 1200° C. at a heating rate of 1° C./min. and kept at that temperature for two hours to obtain a transparent glass. Elemental analysis of the glass revealed that it contained 1% by weight of neodymium.

EXAMPLE 5

Silicon tetramethoxide (100 ml), ethanol (220 ml), water (100 ml), 0.1N aqueous ammonia 720 ml) and erbium chloride.hexahydrate ($ErCl_3.6H_2O$) (0.93 g) were mixed and stirred with a magnetic stirrer for about 15 minutes. Then, the mixture was poured in a messcylinder made of polytetrafluoroethylene (Teflon, a trade mark), and the messcylinder was sealed with an aluminum adhesive tape and kept standing at 35° C. for two days. After making several holes with a diameter of 0.1 mm in the aluminum tape, the mixture in the messcylinder was kept standing at 80° C. for five days, at 100° C. for two days, at 130° C. for two days and at 150° C. for two days to obtain a dried gel.

The dried gel was heated with an electric furnace in an oxygen atmosphere at 350° C. for two days to burn out the residual carbon followed by dehydration in a chlorine atmosphere at 800° C. for two hours. Then, the dehydrated gel was heated in a helium atmosphere at 1200° C. to obtain a transparent pink glass. Elemental analysis of the glass revealed that it contained about 1% by weight of erbium. The glass contained no scattering materials, which indicated that Er atoms did not form clusters and were homogeneously dispersed in the glass.

Figure 3:
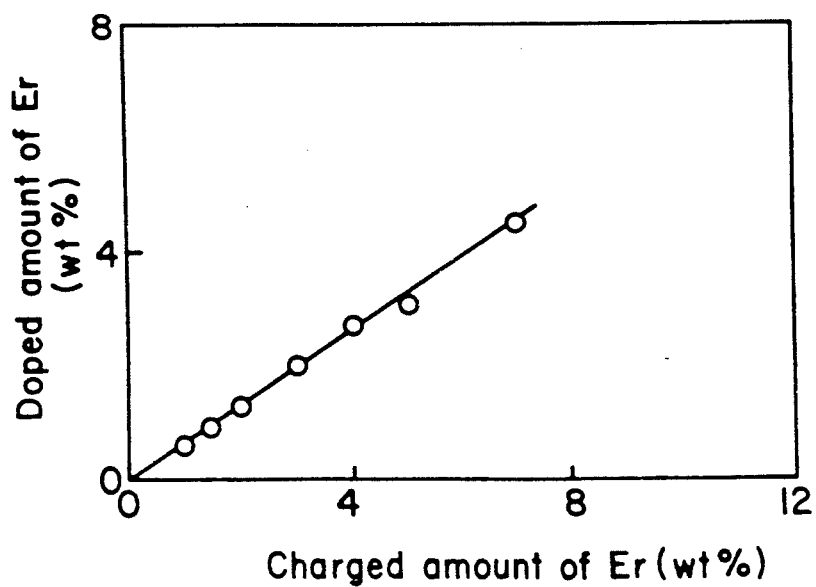
FIG. 3 is a graph showing a relationship between the charged amount of erbium and the doped amount of erbium in Example 5.

With changing the charged amount of erbium methoxide, erbium-doped glass was produced. The relationship between the charged amount of erbium methoxide and the amount of doped erbium is shown in FIG. 3. The doped amount of erbium was measured by atomic absorption analysis. The results indicate that erbium was added to the glass at a yield of 70%.

EXAMPLE 6

In the same manner as in Example 5 except that silicon tetramethoxide (100 ml), ethanol (270 ml), water (100 ml), 0.1N aqueous ammonia (70 ml) and uranium chloride ($UCl_3$) (5.8 g) were used, a glass doped with 1% of uranium was produced.

What is claimed is:

1. A method for producing a rare earth element-doped glass comprising the following steps:
   (a) mixing at least one metal alkoxide with a chloride or nitrate of a rare earth element to form a mixture;
   (b) hydrolyzing mixture obtained in (a);
   (c) adding hydrolyzed mixture obtained in (b) to a mixture of $Si(OR)_4$, wherein R is an alkyl group, and an alcohol containing water;
   (d) hydrolyzing combined mixture obtained in (c) wherein this combined hydrolysis mixture has pH value of 6 to 9; and
   (e) condensing hydrolyzed materials obtained in (d) to form a rare earth element-doped glass.

2. The method according to claim 1, wherein said rare earth element is a lanthanoid element which generates laser in the glass.

3. The method according to claim 1, wherein said metal alkoxide is at least one selected from the group consisting of $Ge(OR)_4$, $Al(OR)_3$, $P(OR)_5$ and $B(OR)_3$.

4. The method according to claim 1, wherein pH is adjusted with aqueous ammonia.

5. The method according to claim 1, which further comprises the steps of:
   drying a gel produced from the hydrolysis of said mixture of said metal alkoxide and $Si(OR)_4$, wherein said drying takes place at a temperature of from 60° C. to 200° C.,
   dehydrating the dried gel in an atmosphere containing chlorine; and
   heating and vitrifying the gel in a helium atmosphere or under a vacuum.

* * * * *